(12) United States Patent
Kind et al.

(10) Patent No.: US 8,627,472 B2
(45) Date of Patent: Jan. 7, 2014

(54) DETERMINING HEAVY DISTINCT HITTERS IN A DATA STREAM

(75) Inventors: Andreas Kind, Rueschlikon (CH); Thomas R. Locher, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 255 days.

(21) Appl. No.: 13/072,136

(22) Filed: Mar. 25, 2011

(65) Prior Publication Data

US 2012/0246726 A1  Sep. 27, 2012

(51) Int. Cl.
*G06F 11/00* (2006.01)
*G06F 12/14* (2006.01)

(52) U.S. Cl.
USPC .............................. 726/23; 709/223; 709/224

(58) Field of Classification Search
USPC ................. 726/23; 708/202; 707/3; 711/118; 709/223, 224; 370/252
See application file for complete search history.

(56) References Cited

U.S. PATENT DOCUMENTS

| | | | |
|---|---|---|---|
| 7,453,922 B2 * | 11/2008 | Oates et al. | 375/148 |
| 7,581,064 B1 * | 8/2009 | Zedlewski et al. | 711/118 |
| 8,078,710 B2 * | 12/2011 | Cormode et al. | 709/223 |
| 2005/0131946 A1 * | 6/2005 | Korn et al. | 707/104.1 |
| 2008/0294604 A1 * | 11/2008 | Goswami | 707/3 |
| 2009/0006607 A1 * | 1/2009 | Bu et al. | 709/224 |
| 2010/0161695 A1 * | 6/2010 | Standfield et al. | 708/202 |
| 2011/0087779 A1 * | 4/2011 | Martin et al. | 709/224 |
| 2011/0122792 A1 * | 5/2011 | Duffield et al. | 370/252 |
| 2011/0173528 A1 * | 7/2011 | Zunger | 715/234 |

OTHER PUBLICATIONS

Bar-Yossef, et al., "Counting Distinct Elements in a Data Stream", In Proc. 6th International Workshop on Randomization and Approximation Techniques (RANDOM), pp. 1-10; 2002.

Durand, et al., "Loglog Counting of Large Cardinalities"; Algorithms Project, INRIA-Rocquencourt, F78153 Le Chesnay (France); pp. 605-617; 2003.

Flajolet, et al., "Probabilistic Counting Algorithms for Data Base Applications", Journal of Computer and System Sciences, 31(2): pp. 182-209; 1985.

Ganguly, et al., "Streaming Algorithms for Robust, Real-Time Detection of DDoS Attacks", In Proc. 27th International Conference on Distributed Computing Systems (ICDCS); pp. 1-25; Nov. 29, 2006.

Giroire, "Order Statistics and Estimating Cardinalities of Massive Data Sets", Discrete Applied Mathematics, 157(2): pp. 406-427; 2009.

Venkatamaran, et al., "New Streaming Algorithms for Fast Detection of Superspreaders" In Proc. 12th ISOC Symposium on Network and Distributed Systems Security (NDSS), pp. 169-166; 2005.

\* cited by examiner

*Primary Examiner* — Dustin Nguyen (74) *Attorney, Agent, or Firm* — Cantor Colburn LLP; Daniel Morris (57) ABSTRACT

A method for determining a heavy distinct hitter (HDH) in a data stream by a data traffic monitor, the data stream comprising a plurality of element-value (e,v) pairs, includes receiving the plurality of (e,v) pairs from the data stream by an HDH module in the data traffic monitor, the HDH module being in communication with a counter block, the counter block comprising a plurality of hash functions, and further comprising a respective pair of distinct counting primitives associated with each hash function of the plurality of hash functions; and adding each of the plurality of (e,v) pairs to one of the distinct counting primitives of the respective pair of distinct counting primitives for each of the plurality of hash functions in the counter block.

18 Claims, 6 Drawing Sheets

DETERMINING HEAVY DISTINCT HITTERS IN A DATA STREAM

BACKGROUND

This disclosure relates generally to the field of traffic monitoring in a computing network, and more specifically to determining heavy distinct hitters in a data stream transmitted over the computing network.

Today's computer infrastructures are highly distributed systems where data traffic is generated at many different locations. Metering or monitoring the data traffic in such a network may be performed for such purposes as troubleshooting, planning and billing. To facilitate metering and monitoring, network routers collect flow information that may be analyzed by processing units. A processing unit may perform tasks such as flow information collection, filtering, analysis, or aggregation. Traffic metering and monitoring may also be performed for security reasons. Anomalies that may indicate security issues may be detected by monitoring a data stream. For example, a processing unit may discover a distributed denial of service (DDoS) attack by observing that a large number of different machines are sending data packets to a small number of destinations. Another network anomaly is a single machine sending data packets to a large number of different destinations, indicating that the single machine may have been compromised and is being used to disseminate a worm.

Security problems such as a DDoS attack or worm dissemination may be detected by determining heavy distinct hitters (HDH) in the data stream. If each packet in a data stream is considered as an element-value (e,v) pair, where each element is a destination and each value is a source address, then the attacked machines in the DDoS scenario are those elements for which the number of distinct values in the observed data stream is large. Alternately, if an element is defined as a source address and a value is defined as a destination address, then the elements with the largest number of distinct values may correspond to compromised machines that are distributing a worm. The elements that occur in the data stream together with a large number of distinct values are heavy distinct hitters. It is desirable to identify the heavy distinct hitters as efficiently as possible.

The HDH problem may be approached by finding all elements that occur in the data stream paired with a number of distinct values that is greater than or equal to a particular threshold. The number of distinct values that occur together with an element may also be determined. However, finding the exact number of HDH elements and values paired with those elements requires a processing unit to store all distinct (e,v) pairs that are received in the data stream, and check for each arriving (e,v) pair whether or not it has already been received, which may require a large amount of memory and processing power, especially at high traffic rates.

To lower memory and processing requirements, a HDH approximation may be determined instead. For example, two parameters epsilon and delta may be defined in the range (0,1), epsilon being the allowed relative error in the estimates, and delta being the failure probability. A threshold T may also be defined as the minimum number of distinct values required for an element to be considered a heavy distinct hitter. After processing a portion of a data stream, an output set of elements that are heavy distinct hitters (i.e., occur with a number of distinct values that is greater than threshold T) may be determined and, for the elements in the set of heavy distinct hitters, the total number of distinct values that occurred with each element may be estimated. If an element is in the set of heavy distinct hitters, then the true number of distinct values that occur with this element is at least (1-epsilon)T, and if an element is not in the output set, then the true number of distinct values that occurs with this element is lower than (1+epsilon)T, and the error in the number of distinct values for all elements is at most epsilon*T. The approximation output must satisfy these conditions with probability at least 1-delta. Thus, the error is at most an epsilon fraction of the threshold T, and the whole process succeeds with probability 1-delta. Since the process succeeds most of the time, delta may be set to a much smaller value than epsilon. As delta is smaller, delta has a smaller impact on the space requirements to compute the approximate solution than epsilon. There may be an anomaly in the case in which one or a few elements occur with a larger number of distinct values than all other elements, or in other words, a few elements occur more often than a certain fraction of all distinct (e,v) pairs. For this situation, if d is the total number of distinct (e,v) pairs, the threshold T may be set to phi*d, where phi is another parameter in the range (0,1). However, approximation of HDHs in a data stream with a low epsilon and low delta with relatively low memory and processing requirements presents challenges.

BRIEF SUMMARY

In one aspect, a method for determining a heavy distinct hitter (HDH) in a data stream by a data traffic monitor, the data stream comprising a plurality of element-value (e,v) pairs, includes receiving the plurality of (e,v) pairs from the data stream by an HDH module in the data traffic monitor, the HDH module being in communication with a counter block, the counter block comprising a plurality of hash functions, and further comprising a respective pair of distinct counting primitives associated with each hash function of the plurality of hash functions; and adding each of the plurality of (e,v) pairs to one of the distinct counting primitives of the respective pair of distinct counting primitives for each of the plurality of hash functions in the counter block.

Additional features are realized through the techniques of the present exemplary embodiment. Other embodiments are described in detail herein and are considered a part of what is claimed. For a better understanding of the features of the exemplary embodiment, refer to the description and to the drawings.

BRIEF DESCRIPTION OF THE SEVERAL VIEWS OF THE DRAWINGS

Referring now to the drawings wherein like elements are numbered alike in the several FIGURES.

DETAILED DESCRIPTION

Embodiments of a data traffic monitor for determining heavy distinct hitters (HDH) in a data stream are provided, with exemplary embodiments being discussed below in detail. A set of counter blocks in the data traffic monitor process (e,v) pairs as they are received from the data stream, and a relatively accurate estimate of the number of distinct values observed with a particular element in the data stream is determined using the counter blocks. Each counter block includes a set of hash functions, and each hash function is associated with two distinct counting primitives. Relatively low processing power and storage space may be required by the data traffic monitor to approximate the HDHs in the data stream with a relatively low error and good probability of success, and the data stream may have a relatively high data rate.

Figure 1:
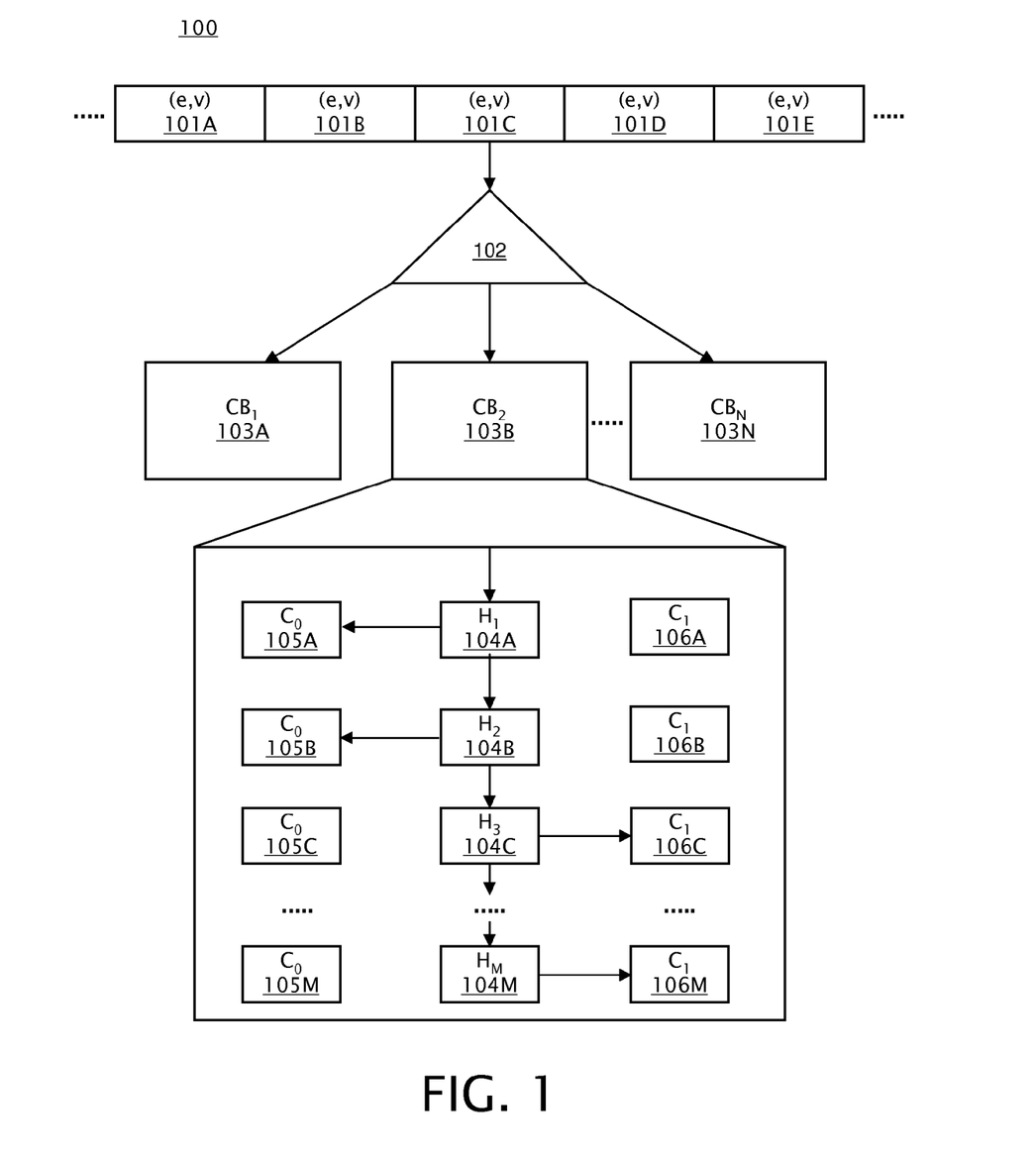
FIG. 1 is a schematic block diagram illustrating an embodiment of a data traffic monitor for determining heavy distinct hitters in a data stream.

FIG. 1 illustrates an embodiment of a data traffic monitor 100. Data traffic monitor 100 includes a HDH module 102 that processes a plurality of element-value (e,v) pairs that are received in a data stream, as indicated by exemplary (e,v) pairs 101A-E. HDH module 102 is in communication with a plurality of counter blocks $CB_1$ to $CB_N$, indicated by blocks 103A-N. A detailed view of an exemplary counter block $CB_2$ is shown. A counter block, such as counter block $CB_2$, includes M hash functions $H_1$ to $H_M$, indicated by blocks 104A-M. Each hash function $H_1$ to $H_M$ is associated with two respective distinct counting primitives: a $C_0$ distinct counting primitive from the set of distinct counting primitives indicated by blocks 104A-M, and a $C_1$ distinct counting primitive from the set of distinct counting primitives indicated by blocks 106A-M. The hash functions $H_1$ to $H_M$ are pseudo-random hash functions that, given an input element e, may return one of two hash results, 0 or 1. The same input element always returns the same hash result from a particular hash function. The two possible hash results from a hash function each map to one of the respective distinct counting primitives $C_0$ and $C_1$ that are associated with the hash function. For example, as shown in FIG. 1, for the (e,v) pair 101C, hash function $H_1$ (104A) maps e to its $C_0$ (105A), hash function $H_2$ (104B) maps e to its $C_0$ (105B), hash function $H_3$ (104C) maps e to its $C_1$ (106C), and hash function $H_M$ (104M) maps e to its $C_1$ (106M). The data traffic monitor 100 may include any appropriate number N of counter blocks, and each counter block may include any appropriate number M of hash functions, with one distinct counting primitive $C_0$ and one distinct counting primitive $C_1$ per hash function, i.e., the number of hash functions M may be different for different counter blocks.

The distinct counting primitives $C_0$ or $C_1$ indicated by blocks 104A-M and 106A-M may be instances of any appropriate distinct counting primitive that may be used for distinct counting. Each distinct counting primitive $C_0$ or $C_1$ includes an add operation for processing received (e,v) pairs, and a return operation that returns the number of distinct items that have been added to the distinct counting primitive. The add operation receives the current (e,v) pair as an input; a call to the add operation may take the form of add((e,v)). The return operation does not require any inputs, and a call to the return operation may take the form of getNum().

Figure 2:
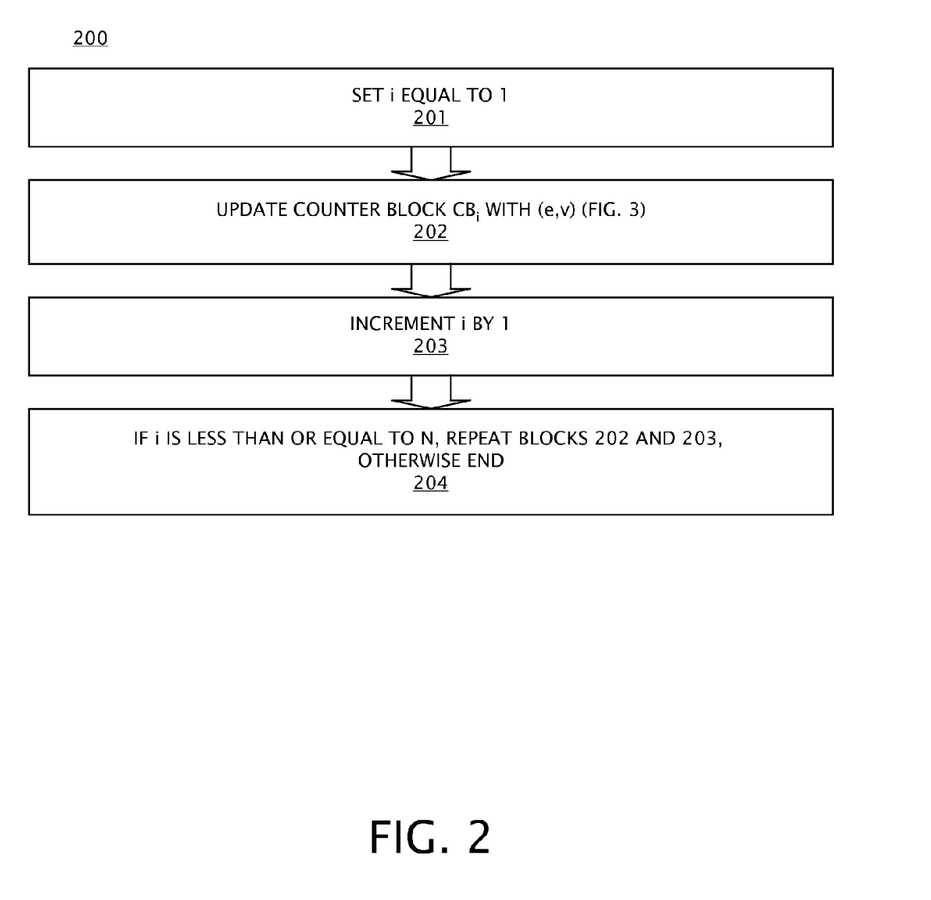
FIG. 2 is a flowchart illustrating an embodiment of a method for processing a received element.
Figure 3:
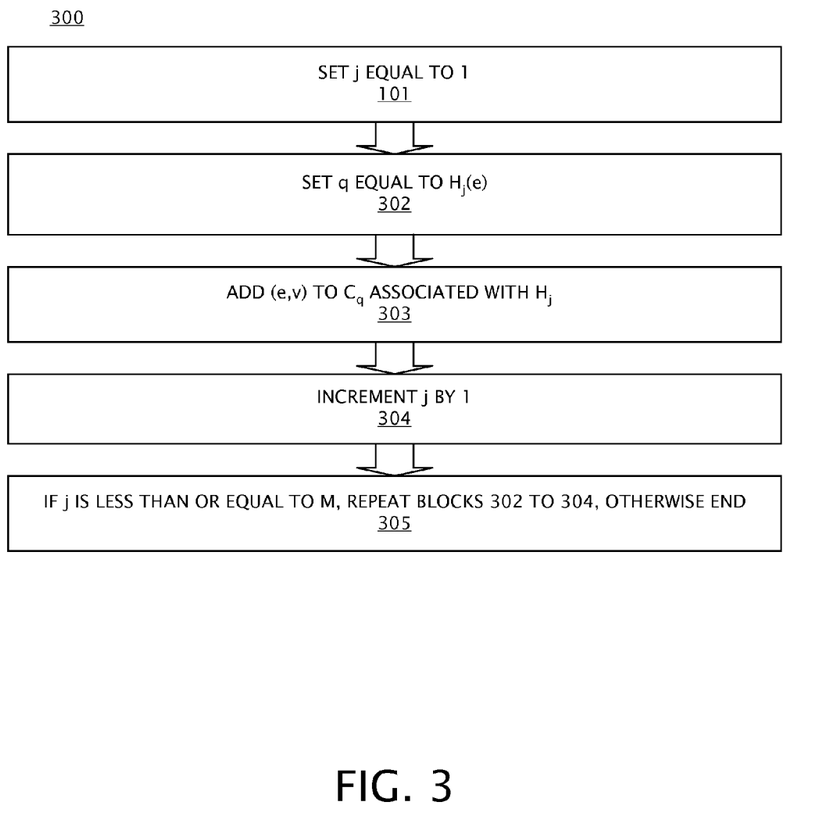
FIG. 3 is a flowchart illustrating an embodiment of a method for processing a received element in a counter block.

Processing of received (e,v) pairs by data traffic monitor 100 is described in further detail with respect to methods 200 and 300 of FIGS. 2-3. Method 200 may be implemented in HDH module 102, and method 300 may be implemented separately in each of counter blocks $CB_1$ to $CB_N$. As shown in FIG. 2, in block 201, parameter i is set to 1. Parameter i is used to step through counter blocks $CB_1$ to $CB_N$. In block 202, counter block $CB_i$ is updated with the current (e,v) pair, which is described in further detail with respect to method 300 of FIG. 3. In block 203, i is incremented by 1, and in block 204, it is determined if i is less than or equal to the number of counter blocks N. If i is less than or equal to N, blocks 202 and 203 are repeated for each of counter blocks $CB_1$ to $CB_N$ until i is greater than N and each of $CB_1$ to $CB_N$ is updated with the current (e,v) pair (for example, (e,v) pair 101C of FIG. 1).

Method 300 of FIG. 3 describes updating a counter block with the current (e,v) pair as is performed in block 202, and is performed individually in each of counter blocks $CB_1$ to $CB_N$. In block 301, a parameter j is set to 1. Parameter j is used to step through all the hash functions $H_1$ to $H_M$ in the counter block. In block 302, a parameter q is set equal to the hash output by hash function $H_j$ for the element e of the current (e,v) pair, i.e., $q=H_j(e)$. The hash function $H_j$ returns either 1 or 0, and therefore q is 1 or 0. Therefore, distinct counting primitive $C_q$ is one of the two distinct counting primitives $C_0$ or $C_1$ that are associated with $H_j$. Because the hash functions $H_1$ to $H_M$ always return the same respective output for the same input, all (e,v) pairs that include element e are added to the distinct counting primitive $C_q$ associated with $H_j$ as they are received. In block 303, (e,v) is added the distinct counting primitive $C_q$ associated with $H_j$. The $C_q$ associated with $H_j$ may process (e,v) by calling the distinct counting primitive add function with the input parameter (e,v), i.e., add((e,v)). After the current (e,v) pair is added to distinct counting primitive $C_q$ associated with hash function $H_j$, j is incremented by 1 in block 304, and, if j is determined to be is less than or equal to the number M of hash functions in the counter block in block 305, blocks 302, 303, and 304 are repeated until j is greater than M, and the current (e,v) pair is added to one pseudo-randomly selected distinct counting primitive for each hash function $H_1$ to $H_M$ in the counter block.

Figure 4:
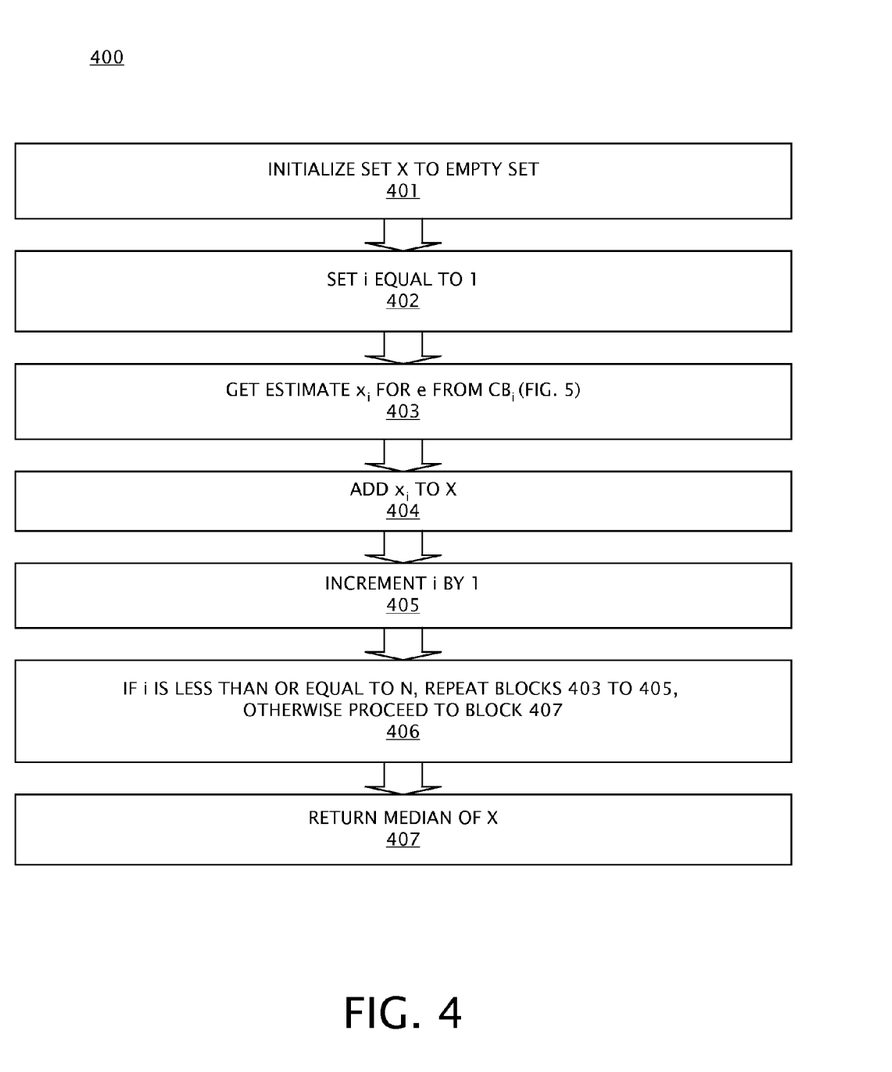
FIG. 4 is a flowchart illustrating an embodiment of a method for determining a number of distinct values received with an element.
Figure 5:
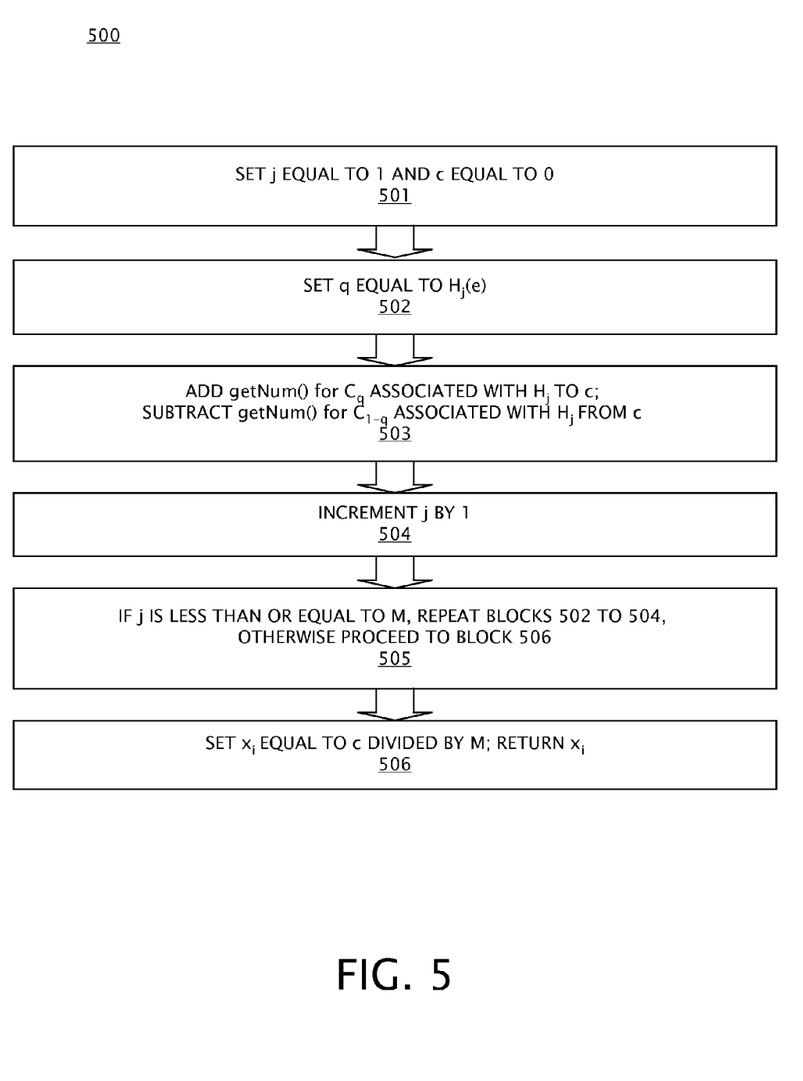
FIG. 5 is a flowchart illustrating an embodiment of a method for determining a number of distinct values received with an element in a counter block.

To determine whether an element e is a HDH in the data stream, methods 400 and 500 of FIGS. 4 and 5 are implemented in HDH module 102 and counter blocks $CB_1$ to $CB_N$, respectively. In block 401, set X is initialized to an empty set. In block 402, parameter i is set to 1. Parameter i is used to step through counter blocks $CB_1$ to $CB_N$. In block 403, $CB_i$ returns an estimate $x_i$ of the number of distinct values that have been observed in the data stream paired with the element e; this is described in further detail below with respect to method 500 of FIG. 5. In block 404, the estimate $x_i$ returned by $CB_i$ in block 403 is added to set X. In block 405, i is incremented by 1, and in block 406, it is determined if i is less than or equal to the total number of counter blocks N. If i is less than or equal to N, blocks 403, 404, and 405 are repeated until i is greater than N and each of $CB_1$ to $CB_N$ has returned an estimate $x_i$ for element e, and all the returned estimates $x_i$ have been added to set X. Then, in block 407, the median of set X is determined, which gives an overall estimate of the number of distinct values that have been observed in the data stream paired with the element e. If the median of set X is over a threshold T, then element e is determined to be a HDH in the data stream.

Determination of $x_i$ for the element e in block 403 of FIG. 4 is discussed in further detail with respect to FIG. 5. Each individual counter block $CB_1$ to $CB_N$ implements method 500 of FIG. 5. In block 501, a parameter j is set to 1, and a parameter c is set to 0. Parameter j is used to step through all the hash functions $H_1$ to $H_M$ in a counter block. In block 502, a parameter q is set equal to the hash given by $H_j$ for the element e, i.e., $q=H_j(e)$. The hash function $H_j$ returns either 1 or 0, and therefore q is 1 or 0. Therefore, distinct counting primitive $C_q$ is one of the two distinct counting primitives $C_0$ or $C_1$ that are associated with $H_j$. Because a hash function always returns the same output for the same input, all (e,v) pairs that include element e were added to the distinct counting primitive $C_q$ associated with $H_j$. In block 503, the output of the return function (i.e., getNum()) for distinct counting primitive $C_q$ associated with $H_j$ is added to c, and the output of the return function (i.e., getNum()) for the other distinct counting primitive associated with $H_j$, $C_{1-q}$ (i.e., the distinct counting primitive to which (e,v) pairs that include element e were not added by $H_j$) is subtracted from c. Parameter j is incremented by 1 in block 504, and, if j is determined to be is less than or equal to the number of hash functions M in the counter block in block 505, blocks 502, 503, and 504 are repeated until j is greater than M, and each of $H_1$ to $H_M$, have added getNum()of their distinct counting primitive $C_q$ to c and subtracted getNum() of their distinct counting primitive $C_{1-q}$ from c. Then, in block 506, the counter block returns c divided by the number of hash functions M as estimate $x_i$ of the number of distinct values that have been observed in the data stream paired with the element e, which is added to set X by HDH module 102 as discussed above in block 404.

In an exemplary embodiment, a distinct counting primitive, which may be any of the distinct counting primitives indicated by blocks 105A-M and 106A-M, may store k hash values, $h_1$ to $h_k$. These hash values are sorted, i.e., $h_1 <= h_2 <= \ldots h_k$. Initially, all the hash values $h_1$ to $h_k$ may be set to infinity. The distinct counting primitive may further include a single pseudo-random hash function that maps a received input to a hash output in the range (0, 1) uniformly at random. The same input is always hashed to the same hash output by the distinct counting primitive hash function. The add function may be implemented as follows. The add function receives the current (e,v) pair as an input, and the hash output of (e,v) is determined by the distinct counting primitive hash function. The hash function will always return the same hash output for the same input, and will return different hash outputs for (e,v) pairs that have the same element but different values. Hash value $h_k$ is then set equal to the hash output of (e,v) if the hash output of (e,v) is less than $h_k$. When the value of $h_k$ changes, the hash values $h_1$ to $h_k$ are reordered so that they are sorted, i.e., $h_1 <= h_2 <= \ldots h_k$, such that the k smallest hash values that are encountered are kept. The return function getNum()may be implemented by returning the number of the hash values $h_1$ to $h_k$ that are not set to infinity, which is the correct number of distinct (e,v) pairs processed by the hash function unless there was a hash collision, which occurs with negligible probability. However, in the case where all of hash values $h_1$ to $h_k$ are not infinity, $(k-1)/h_k$ is returned, which is an unbiased estimate of the correct number of distinct (e,v) pairs processed by the add function. The number of hash values $h_1$ to $h_k$ may be greater than or equal to 3 in some embodiments. Such a distinct counting primitive is discussed in further detail in F. Giroire, "Order Statistics and Estimating Cardinalities of massive Data Sets", Discrete Applied Mathematics, 157(2):406-427, 2009, which is herein incorporated by reference in its entirety. The above distinct counting primitive implementation is discussed for exemplary purposes only; any appropriate distinct counting primitive having functionality for adding distinct items and for returning a number of distinct items that were added to the distinct counting primitive may be used for distinct counting primitives $C_0$ or $C_1$ that are indicated by blocks 104A-M and 106A-M of FIG. 1.

If the parameters epsilon, delta, and phi are relatively small, e.g., epsilon ≤0.1, delta ≤0.1, and phi ≤0.5 and the total number of distinct elements e in the data stream, which is upper bounded by the number of distinct element-value pairs d, which in turn is upper bounded by the length of the data stream, is also not too large, e.g., smaller than 100 million, if the number of counter blocks N is about N:=2*ln(10/(delta*phi)) and the number of hash functions M and associated distinct counting primitive pairs $C_0$ and $C_1$ in each counter block is about M:=22/(epsilon*phi)^2, and an element e is determined to be a HDH when the median of the set X determined by the data traffic monitor 100 for the element e is at least the threshold T, then data traffic monitor 100 determines accurate approximations independent of the distribution of the data stream. In the case that the parameters epsilon, delta, and phi are close to 1 and the number of distinct elements is extremely large, the number of counter blocks N can be set to 2*ln(L/delta), where L is an estimated upper bound on the number of distinct elements e. In some embodiments, the parameter L may be adapted over time to a number that is computed from a moving average function, such as exponentially weighted moving average (EWMA), of the actual total number of distinct elements in previous observation periods. The given values for N and M ensure that the relative error is epsilon for a threshold of T=phi*d with probability at least 1-delta. In most cases, the space requirements for data traffic monitor 100 depends on selection of the parameters epsilon, delta, and phi. Even if the data stream contains an exceedingly large number of distinct elements, the space requirements grow only logarithmically with the number of distinct (e,v) pairs d, which means that HDH system 100 is suitable for very large data streams.

Figure 6:
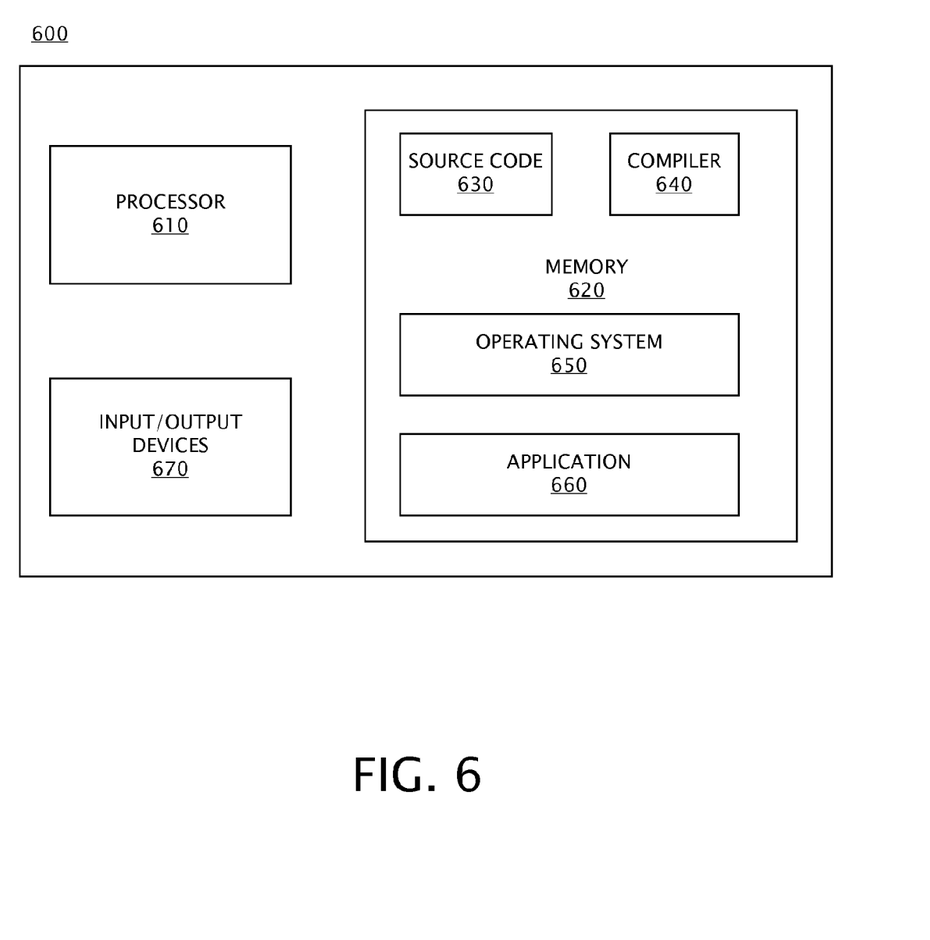
FIG. 6 is a schematic block diagram illustrating an embodiment of a computer that may be used in conjunction with data traffic monitor for determining heavy distinct hitters in a data stream.

FIG. 6 illustrates an example of a computer 600 which may be utilized by exemplary embodiments of a data traffic monitor for determining heavy distinct hitters in a data stream as embodied in software. Various operations discussed above may utilize the capabilities of the computer 600. One or more of the capabilities of the computer 600 may be incorporated in any element, module, application, and/or component discussed herein.

The computer 600 includes, but is not limited to, PCs, workstations, laptops, PDAs, palm devices, servers, storages, and the like. Generally, in terms of hardware architecture, the computer 600 may include one or more processors 610, memory 620, and one or more input and/or output (I/O) devices 670 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 610 is a hardware device for executing software that can be stored in the memory 620. The processor 610 can be virtually any custom made or commercially available processor, a central processing unit (CPU), a digital signal processor (DSP), or an auxiliary processor among several processors associated with the computer 600, and the processor 610 may be a semiconductor based microprocessor (in the form of a microchip) or a macroprocessor.

The memory 620 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 620 may incorporate electronic, magnetic, optical, and/or other types of storage media. Note that the memory 620 can have a distributed architecture, where various components are situated remote from one another, but can be accessed by the processor 610.

The software in the memory 620 may include one or more separate programs, each of which comprises an ordered listing of executable instructions for implementing logical functions. The software in the memory 620 includes a suitable operating system (O/S) 650, compiler 640, source code 630, and one or more applications 660 in accordance with exemplary embodiments. As illustrated, the application 660 comprises numerous functional components for implementing the features and operations of the exemplary embodiments. The application 660 of the computer 600 may represent various applications, computational units, logic, functional units, processes, operations, virtual entities, and/or modules in accordance with exemplary embodiments, but the application 660 is not meant to be a limitation.

The operating system 650 controls the execution of other computer programs, and provides scheduling, input-output control, file and data management, memory management, and communication control and related services. It is contemplated by the inventors that the application 660 for implementing exemplary embodiments may be applicable on all commercially available operating systems.

Application 660 may be a source program, executable program (object code), script, or any other entity comprising a set of instructions to be performed. When a source program, then the program is usually translated via a compiler (such as the compiler 640), assembler, interpreter, or the like, which may or may not be included within the memory 620, so as to operate properly in connection with the O/S 650. Furthermore, the application 660 can be written as an object oriented programming language, which has classes of data and methods, or a procedure programming language, which has routines, subroutines, and/or functions, for example but not limited to, C, C++, C#, Pascal, BASIC, API calls, HTML, XHTML, XML, ASP scripts, FORTRAN, COBOL, Perl, Java, ADA, .NET, and the like.

The I/O devices 670 may include input devices such as, for example but not limited to, a mouse, keyboard, scanner, microphone, camera, etc. Furthermore, the I/O devices 670 may also include output devices, for example but not limited to a printer, display, etc. Finally, the I/O devices 670 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 670 also include components for communicating over various networks, such as the Internet or intranet.

If the computer 600 is a PC, workstation, intelligent device or the like, the software in the memory 620 may further include a basic input output system (BIOS) (omitted for simplicity). The BIOS is a set of essential software routines that initialize and test hardware at startup, start the O/S 650, and support the transfer of data among the hardware devices. The BIOS is stored in some type of read-only-memory, such as ROM, PROM, EPROM, EEPROM or the like, so that the BIOS can be executed when the computer 600 is activated.

When the computer 600 is in operation, the processor 610 is configured to execute software stored within the memory 620, to communicate data to and from the memory 620, and to generally control operations of the computer 600 pursuant to the software. The application 660 and the O/S 650 are read, in whole or in part, by the processor 610, perhaps buffered within the processor 610, and then executed.

When the application 660 is implemented in software it should be noted that the application 660 can be stored on virtually any computer readable medium for use by or in connection with any computer related system or method. In the context of this document, a computer readable medium may be an electronic, magnetic, optical, or other physical device or means that can contain or store a computer program for use by or in connection with a computer related system or method.

The application 660 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium.

More specific examples (a nonexhaustive list) of the computer-readable medium may include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical). Note that the computer-readable medium could even be paper or another suitable medium, upon which the program is printed or punched, as the program can be electronically captured, via for instance optical scanning of the paper or other medium, then compiled, interpreted or otherwise processed in a suitable manner if necessary, and then stored in a computer memory.

In exemplary embodiments, where the application 660 is implemented in hardware, the application 660 can be implemented with any one or a combination of the following technologies, which are well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The technical effects and benefits of exemplary embodiments include a relatively accurate estimation of heavy distinct hitters in a data stream with relatively low processing and storage requirements by a data traffic monitor.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A method for determining a heavy distinct hitter (HDH) in a data stream by a data traffic monitor, the data stream comprising a plurality of element-value (e,v) pairs, the method comprising:
    receiving the plurality of (e,v) pairs from the data stream by an HDH module in the data traffic monitor, the HDH module being in communication with a counter block, the counter block comprising a plurality of hash functions, and further comprising a respective pair of distinct counting primitives associated with each hash function of the plurality of hash functions; and
    adding each of the plurality of (e,v) pairs to one of the distinct counting primitives of the respective pair of distinct counting primitives for each of the plurality of hash functions in the counter block.

2. The method of claim 1, wherein a hash function comprises a pseudo-random hash function that returns one of two possible hash results in response to an input, wherein the two possible hash results each map to a respective distinct counting primitive of the pair of distinct counting primitives associated with the hash function, and wherein the hash function always returns the same hash result for the same input.

3. The method of claim 2, further comprising adding an (e,v) pair to a distinct counting primitive based on the hash result from the hash function in response to the element e as an input.

4. The method of claim 1, wherein a distinct counting primitive is further configured to return a number of distinct (e,v) pairs that have been added to the distinct counting primitive.

5. The method of claim 4, further comprising determining an estimate of a number of distinct values observed with an element e in the data stream by the counter block, wherein determining an estimate of a number of distinct values observed with the element e in the data stream comprises:
    for each hash function of the plurality of hash functions, adding, to a total, the number of distinct (e,v) pairs that have been added to the distinct counting primitive associated with the hash function that is indicated by the hash result given by the hash function in response to the element e as an input, and subtracting, from the total, the number of distinct (e,v) pairs that have been added to the distinct counting primitive associated with the hash function that is not indicated by the hash result given by the hash function in response to the element e as an input;
    dividing the total by the number of hash functions in the counter block to determine an estimate of a number of distinct values observed with the element e in the data stream; and
    returning the estimate to the HDH module.

6. The method of claim 5, wherein HDH module is in communication with a plurality of counter blocks, and wherein each of the plurality of counter blocks returns an estimate of a number of distinct values observed with the element e in the data stream to the HDH module.

7. The method of claim 6, further comprising determining a median of the estimates received from the plurality of counter blocks by the HDH module, and in the event the median is greater than a threshold, determining that the element e is a HDH in the data stream.

8. The method of claim 1, wherein an element of an (e,v) pair represents a source address, and a value of an (e,v) pair represents a destination address.

9. The method of claim 1, wherein an element of an (e,v) pair represents a destination address, and a value of an (e,v) pair represents a source address.

10. A method for determining a heavy distinct hitter (HDH) in a data stream by a data traffic monitor, the data stream comprising a plurality of element-value (e,v) pairs, the method comprising:
    receiving an (e,v) pair of the plurality of (e,v) pairs from the data stream by an HDH module in the data traffic monitor, the HDH module being in communication with a counter block, the counter block comprising a plurality of hash functions and a plurality of pairs of distinct counting primitives, wherein each pair of distinct counting primitives is associated with a single respective hash function of the plurality of hash functions, and each of the plurality of hash functions is associated with a single pair of distinct counting primitives of the plurality of pairs of distinct counting primitives; and
    for each hash function of the plurality of hash functions:
        selecting a distinct counting primitive of the pair of distinct counting primitives associated with the hash function based on the received (e,v) pair; and
        adding the (e,v) pair to the selected distinct counting primitive.

11. The method of claim 10, wherein each hash function of the plurality of hash functions comprises a pseudo-random hash function that returns one of two possible hash results in response to an input, wherein each hash function always returns the same hash result for the same input; and
    wherein each of the two possible hash results for each hash function of the plurality of hash functions maps to selection of a respective one of the pair of distinct counting primitives that are associated with the hash function.

12. The method of claim 11, wherein each of the plurality of (e,v) pairs are added to a selected distinct counting primitive of the respective pair of distinct counting primitives based on the hash result that is returned based on inputting the element e to the respective hash function that is associated with the pair of distinct counting primitives.

13. The method of claim 10, wherein each distinct counting primitive of the plurality of pairs of distinct counting primitives is configured to return a number of distinct (e,v) pairs that have been added to the distinct counting primitive.

14. The method of claim 10, further comprising determining an estimate of a number of distinct values v paired with a particular element e in the data stream by the counter block, wherein determining the estimate of the number of distinct values v paired with the particular element e in the data stream comprises:

initializing a total to zero;
for each hash function of the plurality of hash functions:
  adding, to the total, a number of distinct (e,v) pairs that have been added to a first distinct counting primitive of the pair of distinct counting primitives associated with the hash function, wherein the first distinct counting primitive is mapped to a hash result that is returned by the hash function in response to inputting the particular element e to the hash function; and
  subtracting, from the total, the number of distinct (e,v) pairs that have been added to a second distinct counting primitive of the pair of distinct counting primitives, wherein the second distinct counting primitive is not mapped to the hash result that is returned by the hash function in response to inputting the particular element e to the hash function;
dividing the total by the number of the plurality of hash functions in the counter block to determine an estimate for the counter bock of the number of distinct values observed with the particular element e in the data stream; and returning the estimate from the counter block to the HDH module.

15. The method of claim 14, wherein HDH module is in communication with a plurality of counter blocks, and wherein each of the plurality of counter blocks returns a respective estimate of a number of distinct values observed with the particular element e in the data stream to the HDH module.

16. The method of claim 15, further comprising determining a median of the estimates received from the plurality of counter blocks by the HDH module, and in the event the median is greater than a threshold, determining that the particular element e is a HDH in the data stream.

17. The method of claim 10, wherein an element of an (e,v) pair represents a source address, and a value of an (e,v) pair represents a destination address.

18. The method of claim 10, wherein an element of an (e,v) pair represents a destination address, and a value of an (e,v) pair represents a source address.

* * * * *